United States Patent [19]

Takatori

[11] Patent Number: 5,732,897
[45] Date of Patent: Mar. 31, 1998

[54] PHOTO FILM CASSETTE HAVING REGULATING PORTION FOR PREVENTING INCLINATION OF SPOOL LOOK DEVICE

[75] Inventor: Tetsuya Takatori, Kanagawa, Japan

[73] Assignee: Fuji Photo Film Co., Ltd., Kanagawa, Japan

[21] Appl. No.: 687,914

[22] Filed: Jul. 29, 1996

[30] Foreign Application Priority Data

Jul. 31, 1995 [JP] Japan .................. 7-195192

[51] Int. Cl.⁶ .................................. G03C 3/00
[52] U.S. Cl. .................... 242/348.4; 396/514
[58] Field of Search ................ 242/348, 348.1, 242/348.4, 588.3, 588.5; 396/511, 512, 514, 515

[56] References Cited

U.S. PATENT DOCUMENTS

| | | |
|---|---|---|
| 4,834,306 | 5/1989 | Robertson et al. |
| 5,174,519 | 12/1992 | Ol et al. |
| 5,200,777 | 4/1993 | Zander ............ 396/515 X |
| 5,234,174 | 8/1993 | Pagano et al. ...... 396/515 X |
| 5,271,577 | 12/1993 | Takahashi et al. |
| 5,278,600 | 1/1994 | Takahashi et al. ........ 396/515 |
| 5,317,355 | 5/1994 | Zander et al. |
| 5,347,334 | 9/1994 | Smart et al. ............. 396/515 |
| 5,407,146 | 4/1995 | Takahashi et al. ....... 242/348 |

Primary Examiner—Daniel P. Stodola
Assistant Examiner—William A. Rivera
Attorney, Agent, or Firm—Sughrue, Mion, Zinn, Macpeak & Seas, PLLC

[57] ABSTRACT

A photo film cassette has a cassette shell including first and second shell halves. A spool is rotatable between the shell halves. A trailer of the photo film is retained to the spool. The photo film is wound thereabout in a roll form. A photo film passageway is formed between the shell halves, for passage of the photo film. A shutter is disposed in the photo film passageway in rotatable fashion between open and closed positions to open/close the photo film passageway. A spool lock lever, when the shutter has the closed position, stops the spool from rotating. An indicator plate is secured to one axial end of the spool, for indicating information externally through indicator windows. A partition, disposed inside the cassette shell, defines a photo film chamber and an indicator chamber into which the cassette shell is split. The indicator chamber contains the spool lock lever and the indicator plate in rotatable fashion. A regulating projection is disposed to project on the first shell half and from an inside of the indicator chamber, and prevents the spool lock lever from being inclined toward the indicator plate in the indicator chamber.

9 Claims, 3 Drawing Sheets

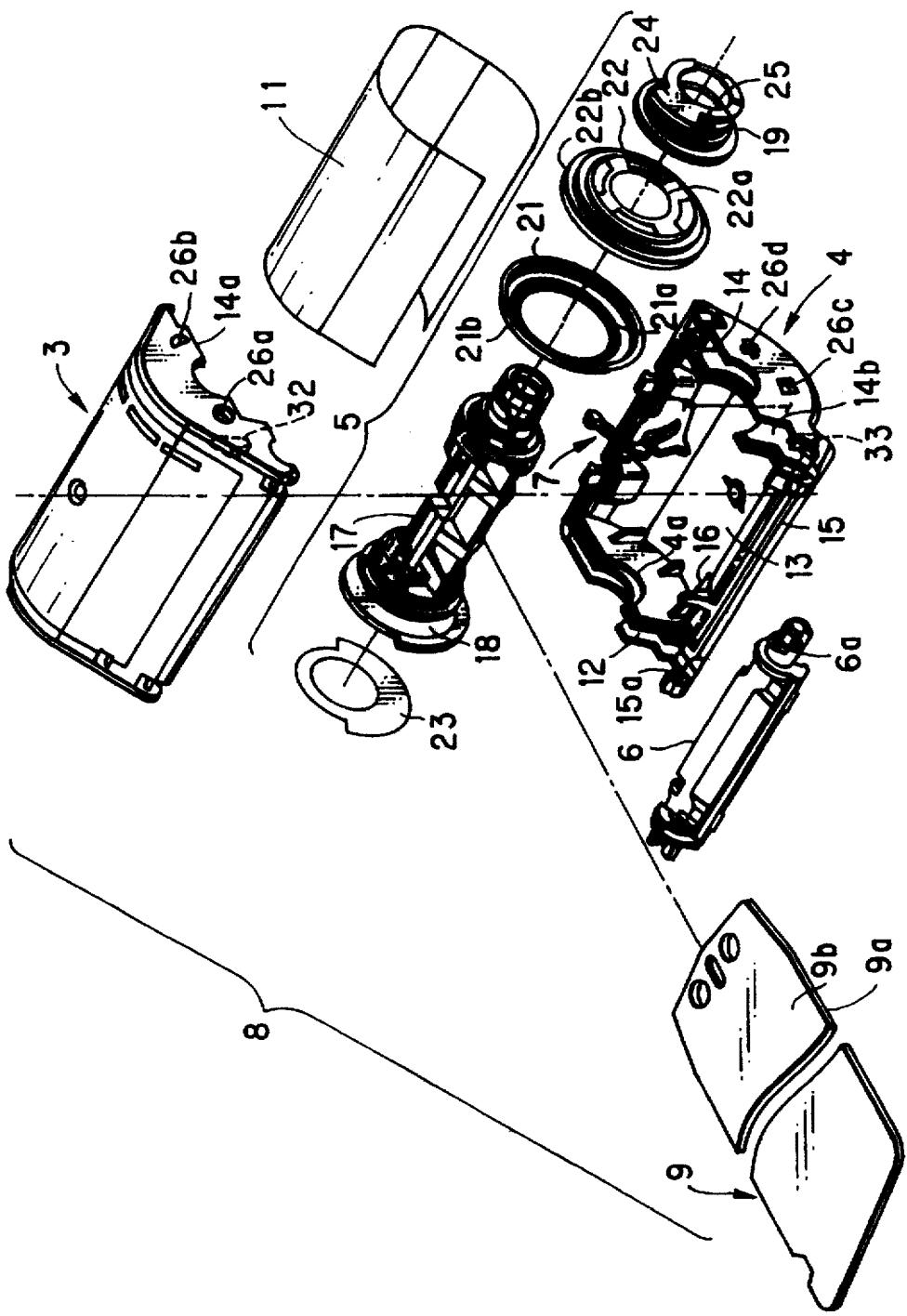

PHOTO FILM CASSETTE HAVING REGULATING PORTION FOR PREVENTING INCLINATION OF SPOOL LOOK DEVICE

BACKGROUND OF THE INVENTION

1. Field of the Invention

The present invention relates to a photo film cassette. More particularly, the present invention relates to a photo film cassette of which a spool lock device contained in an indicator chamber can have a suitable position without errors in assembly of parts of the photo film cassette.

2. Description Related to the Prior Art

There are a plurality of types of widely used photo films. The photo film is used in a form of photo film cassette. A trailing end of the photo film is retained on a spool, which is contained in a cassette shell in rotatable fashion.

U.S. Pat. Nos. 4,834,306, 5,174,519, (corresponding to JP-A 2-124564), 5,271,577 (corresponding to JP-A 3-37645) and 5,407,146 (corresponding to JP-A 3-37645) disclose a leader-advancing type of photo film cassette. The cassette shell of the cassette is formed of resin. A photo film passageway connecting the inside and the outside of the cassette shell is provided with a rotatable shutter member. The shutter member is rotated from a closed position to an open position to open the photo film passageway, before the spool is rotated to advance the photo film to the outside of the cassette shell.

The cassette shell of the photo film cassette has a photo film chamber and an indicator chamber. The photo film chamber contains the photo film. The indicator chamber has a small width, and contains an indicator plate secured to the spool and rotatable therewith. There are a plurality of indicator windows formed through an end face of the cassette shell. The indicator plate is situated to close a selected one of the indicator windows, so that one of the plural positions can be recognized externally. The one position makes a user find a status of the photo film cassette, for example among unexposed, partially exposed, all exposed and developed statuses.

The indicator chamber contains a spool lock device in rotatable fashion. A cam is formed with the shutter member in the photo film passageway. A gear is fixed on the spool. The spool lock device is engaged both with the cam and the gear. When the shutter member has the closed position, the spool lock device hinders the spool from rotating accidentally.

The indicator plate and the spool lock device are individually rotatable inside the indicator chamber. To insert the spool lock device in the indicator chamber, sufficient play is required in positioning the spool lock device. The spool lock device may be inclined in the indicator chamber in its thickness direction even after being mounted. However the indicator chamber should have a reduced width for reducing an overall size of the photo film cassette. If the spool lock device is inclined, the indicator plate is contacted or overlapped on the spool lock device, so that the indicator plate fails to be positioned as designated, the spool lock device fails to lock the spool, or the photo film cassette fails to operate properly in any manner.

The indicator chamber is constituted by upper and lower sub-chambers respectively formed in upper and lower shell halves of the cassette shell. The spool lock device is supported by the lower sub-chamber of the lower shell half. If the spool lock device is inclined in the course of fitting the upper shell half on the lower shell half in the assembly process, the spool lock device is likely to contact on an edge of the upper sub-chamber to be deformed.

SUMMARY OF THE INVENTION

In view of the foregoing problems, an object of the present invention is to provide a photo film cassette in which a spool lock device is prevented from deformation in the course of assembly of part of the cassette.

Another object of the present invention is to provide a photo film cassette in which an indicator plate is prevented from erroneously interfering with a spool lock device.

In order to achieve the above and other objects and advantages of this invention, a partition is disposed inside a cassette shell, for defining a photo film chamber and an indicator chamber into which the cassette shell is split, the photo film chamber containing a roll of a photo film, and the indicator chamber containing a spool lock device and an indicator plate in rotatable fashion. A first regulating portion, disposed to project on a first shell half and from an inside of the indicator chamber, for preventing the spool lock device from being inclined toward the indicator plate in the indicator chamber.

Furthermore, a second regulating portion is disposed to project on a second shell half and from the inside of the indicator chamber, for preventing the spool lock device from being inclined toward the indicator plate in the indicator chamber.

BRIEF DESCRIPTION OF THE DRAWINGS

The above objects and advantages of the present invention will become more apparent from the following detailed description when read in connection with the accompanying drawings, in which:

FIG. 1 is an exploded perspective illustrating a photo film cassette;

DETAILED DESCRIPTION OF THE PREFERRED EMBODIMENT(S) OF THE PRESENT INVENTION

Figure 2A:
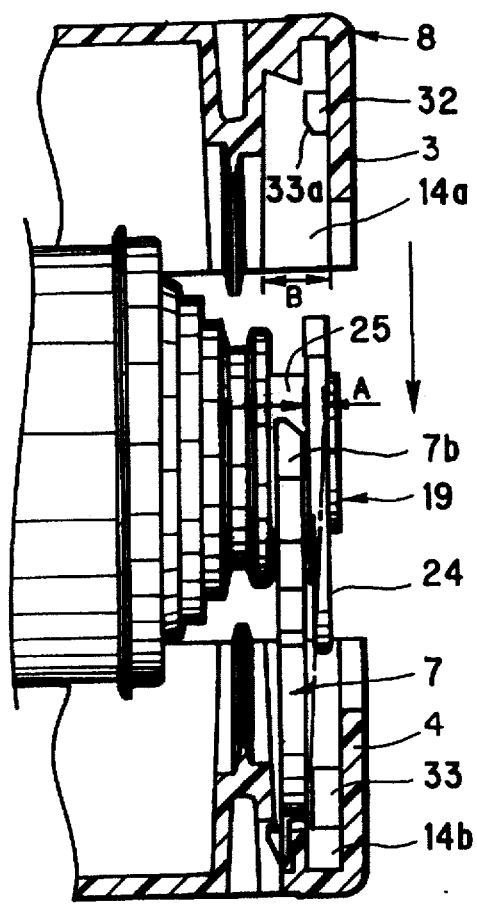
FIG. 2A is a horizontal section, partially cutaway, illustrating an indicator chamber of the photo film cassette in the course of assembly of a spool and shell halves.

In FIG. 1, a photo film cassette 8 includes a cassette shell 3, 4, a spool 5 and a roll of photo film 9. The cassette shell consists of upper and lower shell halves 3 and 4, between which the spool 5 is rotatable. The cassette shell contains a rotatable shutter member 6 and a spool lock lever 7, and has a sticker 11 attached to the outside thereof.

The inside of the cassette shell 8 has partitions, which split the inside into a data plate chamber 12, a photo film chamber 13 and an indicator chamber 14. Between the shell halves 3 and 4, there is a photo film passageway 15 through which the photo film 9 is advanced and rewound. In a position inward from the photo film passageway 15, the shutter member 6 for opening/closing the photo film passageway 15 is mounted in rotatable fashion. A separator claw 16 is formed integrally with the lower shell half 4, and adapted to separate a leading end of the photo film 9 about the spool 5, and to direct it into the photo film passageway 15.

The spool 5 includes a spool core 17, a data plate 18, a barrel member 19 and flexible disks 21 and 22. A trailing end of the photo film 9 is retained to the spool core 17. The data plate 18 is formed with an axial end of the spool core 17. The barrel member 19 is formed with another axial end of the spool core 17. The disks 21 and 22 render the roll of the photo film 9 neat between the data plate 18 and the barrel member 19.

The data plate chamber 12 in the cassette 8 contains the data plate 18 in rotatable fashion. A bar code sticker 23 is attached to the data plate 18, and has a bar code printed to represent various kinds of data related to the photo film 9. The bar code is read by an external apparatus, such as a camera, which is loaded with the photo film cassette 2.

Figure 2B:
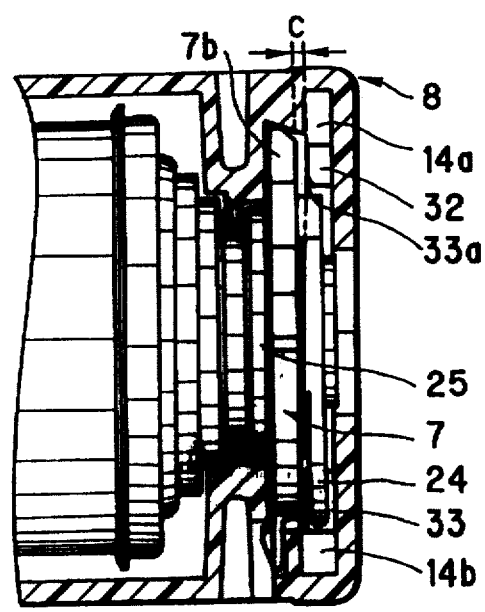
FIG. 2B is a horizontal section, partially cutaway, illustrating the indicator chamber after assembly of the spool and the shell halves.

In FIGS. 2A and 2B, the indicator chamber 14 is constituted by upper and lower sub-chambers 14a and 14b respectively formed in the shell halves 3 and 4. The indicator chamber 14 contains the barrel member 19, an indicator plate 24 and the spool lock lever 7 in a rotatable manner. The barrel member 19 has a gear 25, which operates for stopping rotation of the indicator plate 24 and the spool 5. The indicator plate 24, when stopped, indicates a used status of the photo film 9.

The indicator plate 24 has a conspicuous color, and a sector shape. The indicator plate 24 is stopped and positioned in a selected one of indicator windows 26a–26d, which are associated respectively with status information of being unexposed, partially exposed, all exposed, and developed. The selected one of the indicator windows 26a–26d where the indicator plate 24 appear indicates the associated one of the four statuses.

Figure 3:
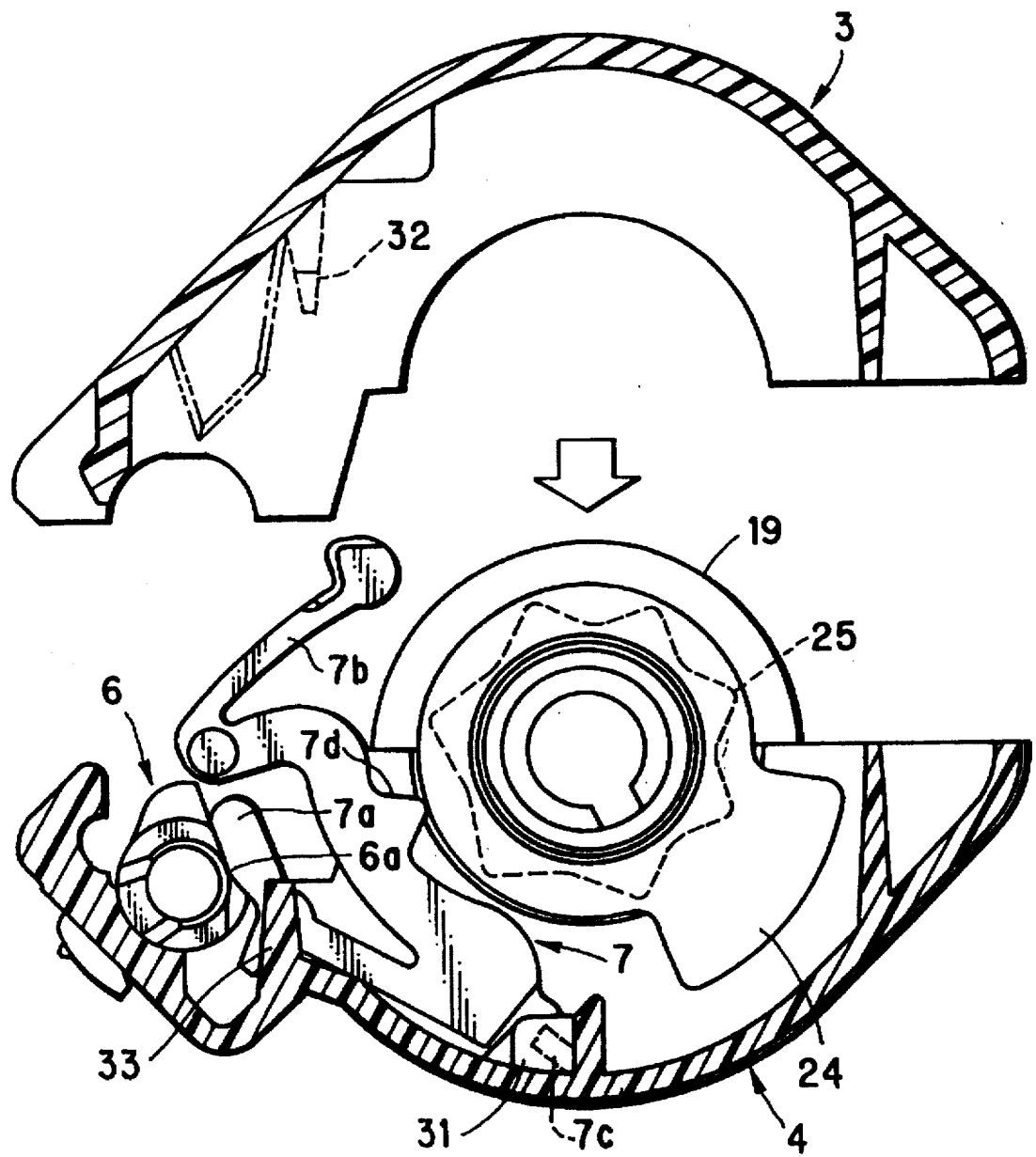
FIG. 3 is a cross section illustrating the indicator chamber in the course of assembly.

In FIG. 3, the spool lock lever 7 has a first arm 7a, a second arm 7b and a claw portion 7d. Details of the spool lock lever 7 are disclosed in U.S. Pat. No. 5,317,355. A bottom of the spool lock lever 7 has a support end portion 7c. The support end portion 7c is received in an engaging hole 31 formed in the lower sub-chamber 14b, to support the spool lock lever 7 in the indicator chamber 14 swingably. The first arm 7a is contacted on a cam 6a formed with the shutter member 6. When the shutter member 6 has a closed position, the first arm 7a is pressed by the cam 6a, to bias the spool lock lever 7 in a direction toward the gear 25.

When the shutter member 6 has an open position, the first arm 7a is released from being depressed by the cam 6a. The claw portion 7d is released from being pressed against the gear 25. With the photo film cassette 8 having the unexposed status, the shutter member 6 has the closed position. The claw portion 7d is meshed with the gear 25, to hinder the spool 5 from rotating in an unwinding direction unwinding the photo film. A camera has a rotary drive shaft, which rotates the shutter member 6 to the open position. The claw portion 7d is disengaged from the gear 25. The spool 5 is allowed to rotate in the unwinding direction.

The lower sub-chamber 14b of the indicator chamber 14 has a regulating projection 33. While the support end portion 7c of the spool lock lever 7 is inserted in the engaging hole 31, the regulating projection 33 prevents the spool lock lever 7 from inclination in the lower sub-chamber 14b. The support end portion 7c and the engaging hole 31 are formed to be fitted together in a loose manner for making it easy to position the spool lock lever 7. After the spool lock lever 7 is secured into the lower sub-chamber 14b, the spool lock lever 7 has a play with which the spool lock lever 7 is inclinable in the direction of its thickness. The regulating projection 33 limits a movable range of the spool lock lever 7. In FIG. 2A, the regulating projection 33 projects from the lower sub-chamber 14b, and is contacted on the first arm 7a of the spool lock lever 7.

The upper sub-chamber 14a of the indicator chamber 14 has a regulating projection 32. After engaging the support end portion 7c with the lower sub-chamber 14b, and engaging the upper shell half 3 with the lower shell half 4, the regulating projection 32 prevents the spool lock lever 7 from inclination in the indicator chamber 14. The regulating projection 32 keeps the spool lock lever 7 from interfering with the indicator plate 24 contained in the indicator chamber 14. As illustrated in FIG. 2B, the regulating projection 32 is contacted on the second arm 7b (see FIG. 3) at the top of the spool lock lever 7 after engaging the upper shell half 3 with the lower shell half 4 to avoid inclining the spool lock lever 7 to the indicator plate 24.

The photo film chamber 13 in the cassette shell 8 contains the disks 21 and 22 with the spool core 17 inserted therein. The disks 21 and 22 have a two-stepped cup shape, and have axial holes 21a and 22a in their respective center. The periphery of the disks 21 and 22 has respective ring-like lips 21b and 22b, which cover edges of outermost turns of the roll of the photo film 9 about the spool core 17, to prevent the photo film 9 from being loosened in the photo film cassette 8.

Each of the disks 21 and 22 is thinly formed from soft plastic material, for easiness in deformation when the photo film 9 is advanced to the outside. The spool core 17 and the disks 21 and 22 are inserted into the photo film chamber 13 together with the photo film 9 about the spool core 17.

Before and after the photo film 9 is exposed, the photo film 9 is totally wound in the photo film cassette 8. The shutter member 6 has the closed position to close the photo film passageway 15. No ambient light enters the photo film cassette 8 through the photo film passageway 15. Also the spool 5 is stopped by the spool lock lever 7 from rotating accidentally. When the photo film passageway 15 opens by rotating the shutter member 6, the leader of the photo film 9 is separated by the separator claw 16 and advanced through the photo film passageway 15.

In operation of manufacturing the photo film cassette 8, the shutter member 6 is placed in a slot 15a inside the photo film passageway 15 first. The spool lock lever 7 is inserted in the lower sub-chamber 14b in the lower shell half 4. The support end portion 7c is engaged with the engaging hole 31, to support the spool lock lever 7 inside the lower shell half 4. The data plate 18, the barrel member 19 and the disks 21 and 22 having been mounted on the spool core 17, the spool 5 is placed in gaps 4a as bearing holes inside the lower shell half 4. After placing the spool lock lever 7, the shutter member 6 and the spool 5 on the lower shell half 4, the upper shell half 3 is fitted on the lower shell half 4.

The regulating projection 33 in the lower sub-chamber 14b is contacted on the first arm 7a of the spool lock lever 7, to regulate the position of the spool lock lever 7. A maximum amount A of the play of the spool lock lever 7 in FIG. 2A is smaller than the width B of openness of the upper sub-chamber 14a. The spool lock lever 7 is not contacted on an edge of the upper sub-chamber 14a in fitting the upper shell half 3 on the lower shell half 4, so that the spool lock lever 7 is not bent or damaged.

While the upper shell half 3 is fitted on the lower shell half 4, the second arm 7b of the spool lock lever 7 is contacted on the regulating projection 32 in the upper sub-chamber 14a. A bottom edge of the regulating projection 32 has an inclined face 33a, which guides the second arm 7b of the spool lock lever 7 during insertion into the upper sub-chamber 14a, for avoiding errors in positioning the second arm 7b. The upper shell half 3 is tightly fitted on the lower shell half 4, to contact the regulating projection 32 on the second arm 7b of the spool lock lever 7, of which a movable range or play is regulated by the regulating projection 32.

The shutter member 6 is mounted in the photo film passageway 15 and the spool 5 is mounted in the cassette shell 8, both by fitting the upper shell half 3 on the lower shell half 4. Finally the sticker 11 is attached to the outside of the cassette shell 8, to obtain the photo film cassette.

As illustrated in FIG. 2B, the maximum play amount C of the spool lock lever 7 after the engagement of the shell halves 3 and 4 is smaller than the maximum play amount A of the spool lock lever 7 before the engagement of the shell halves 3 and 4. If the spool lock lever 7 is incidentally moved closer to the indicator plate 24 by inclining the photo film cassette as handled manually, the spool lock lever 7 is not contacted or overlapped on the indicator plate 24. The spool lock lever 7 can be kept in operation without failure.

Preferable and desirable values of the maximum play amount A before fitting the shell halves 3 and 4, the width B of openness of the upper sub-chamber 14a, and the maximum play amount C after the fitting are indicated in the following table.

| Values (in mm) | Preferable | Desirable |
| --- | --- | --- |
| Maximum play amount A | $0.1 \leq A \leq 2.0$ | $0.2 \leq A \leq 1.2$ |
| Width B of openness | $1.0 \leq B \leq 5.0$ | $2.0 \leq B \leq 4.0$ |
| Maximum play amount C | $0.05 \leq C \leq 1.0$ | $0.1 \leq C \leq 0.5$ |

Effectiveness of the regulating projections 32 and 33 for avoiding deformation of the spool lock lever 7 while mounted, and for avoiding contact between the spool lock lever 7 and the indicator plate 24 is indicated in the following table.

| Effectiveness | (1) | (2) |
| --- | --- | --- |
| No regulating projections | D | D |
| Only the regulating projection 33 of the lower sub-chamber 14b | A | B |
| Only the regulating projection 32 of the upper sub-chamber 14a | C | A |
| The regulating projections 32 and 33 of both the sub-chambers 14a and 14b | A | A |

(1) Effective in avoiding deformation of the spool lock lever 7 while fitting the shell halves 3 and 4,
(2) Effective in avoiding contact between the spool lock lever 7 and the indicator plate 24.
A: Excellent, B: Good, C: Fair or barely usable, and D: Failure.

In the above embodiment, the regulating projections 32 and 33 are formed. It is to be noted that the present invention is also applicable to a photo film cassette in which only one of the regulating projection 32 of the upper sub-chamber 14a and the regulating projection 33 of the lower sub-chamber 14b is formed, while eliminating another one of them.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photo film cassette, comprising
   a cassette shell including first and second shell halves;
   a spool, which is contained between said first and second shell halves in rotatable fashion, to which a trailer of photo film is retained, and about which said photo film is wound in the form of a roll;
   a gear secured to one axial end of said spool;
   a photo film passageway, formed between said first and second shell halves, for passage of said photo film;
   a shutter, disposed in said photo film passageway in rotatable fashion between open and closed positions to open/close said photo film passageway, said shutter having a cam disposed on one axial end thereof;
   a spool lock device, attached to said first shell half, said spool lock device engaged with said cam and engaged with said gear when said shutter is in said closed position, for stopping said spool from rotating;
   an indicator plate, secured to said one axial end of said spool, for indicating information externally through at least one indicator window formed in said cassette shell;
   a partition, disposed inside said cassette shell, for defining a photo film chamber and an indicator chamber into which said cassette shell is split, said photo film chamber containing said roll of said photo film, and said indicator chamber containing said spool lock device and said indicator plate in rotatable fashion; and
   a first regulating portion, projecting from said second shell half to an inside of said indicator chamber, for preventing said spool lock device from being inclined toward said indicator plate in said indicator chamber.

2. A photo film cassette as defined in claim 1, wherein said spool lock device is disposed between said partition and said indicator plate.

3. A photo film cassette as defined in claim 2, wherein said photo film passageway is defined between first and second walls, said first wall being integral with said second shell half, said second wall being integral with said first shell half, said first wall being contacted on a first surface of said photo film oriented outwards relative to said roll, said second wall being contacted on a second surface of said photo film oriented inwards relative to said roll, and said spool lock device being supported on said first shell half in rotatable fashion.

4. A photo film cassette as defined in claim 3, further comprising a second regulating portion, projecting from said first shell half to an inside of said indicator chamber, for preventing said spool lock device from being inclined toward said indicator plate in said indicator chamber.

5. A photo film cassette as defined in claim 4, wherein $$0.1 \text{ mm} \leq A \leq 2.0 \text{ mm}$$

where A is a maximum amount of play in which said spool lock device is inclinable away from said partition, when said second shell half is separate from said spool and said first shell half.

6. A photo film cassette as defined in claim 3, wherein $$0.05 \text{ mm} \leq C \leq 1.0 \text{ mm}$$

where C is a maximum amount of play in which said spool lock device is inclinable away from said partition toward said first regulating portion.

7. A photo film cassette as defined in claim 3, further comprising an inclined face, formed on said first regulating portion, for guiding said spool lock device being inserted into said second shell half while said second shell half is mounted on said first shell half with said spool, to prevent said first regulating portion from interfering with said spool lock device.

8. A photo film cassette as defined in claim 1, further comprising an engaging hole in said first shell half and inside said indicator chamber;

said spool lock device including:
- a claw portion, meshed with said gear, for hindering said spool from rotating;
- a support end portion, received in said engaging hole in said first shell half, for supporting said claw portion in swingable fashion in said indicator chamber;
- a first arm, contacted on said cam of said shutter, wherein when said shutter is in said closed position, said first arm is pressed by said cam so as to move said claw portion toward said gear to mesh said claw portion with said gear; and wherein when said shutter is in said open position, said cam is no longer pressed against said first arm to allow disengaging of said claw portion from said gear.

9. A photo film cassette, comprising:

a cassette shell including first and second shell halves;

a spool, which is contained between said first and second shell halves in rotatable fashion, to which a trailer of photo film is retained, and about which said photo film is wound in the form of a roll;

a gear secured to one axial end of said spool;

a photo film passageway, formed between said first and second shell halves, for passage of said photo film;

a shutter, disposed in said photo film passageway in rotatable fashion between open and closed positions to open/close said photo film passageway, said shutter having a cam disposed on one axial end thereof;

a spool lock device attached to said first sheet half, said spool lock device engaged with said cam and engaged with said gear when said shutter is in said closed position, for stopping said spool from rotating;

an indicator plate, secured to said one axial end of said spool, for indicating information externally through at least one indicator window formed in said cassette shell;

a partition, disposed inside said cassette shell, for defining a photo film chamber and an indicator chamber into which said cassette shell is split, said photo film chamber containing said roll of said photo film, and said indicator chamber containing said spool lock device and said indicator plate in rotatable fashion; and first and second regulating portions, respectively projecting from said second and first shell halves to an inside of said indicator chamber, for preventing said spool lock device from being inclined toward said indicator plate in said indicator chamber.

* * * * *